United States Patent
Pfister et al.

(10) Patent No.: US 11,044,199 B2
(45) Date of Patent: Jun. 22, 2021

(54) INFERRING DEVICE LOAD AND AVAILABILITY IN A NETWORK BY OBSERVING WEAK SIGNAL NETWORK BASED METRICS

(71) Applicant: Cisco Technology, Inc., San Jose, CA (US)

(72) Inventors: Pierre Pfister, Angers (FR); W. Mark Townsley, Paris (FR); Enzo Fenoglio, Issy-les-Moulineaux (FR); Hugo Latapie, Long Beach, CA (US); Yoann Desmouceaux, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/003,937

(22) Filed: Jun. 8, 2018

(65) Prior Publication Data

US 2019/0379605 A1 Dec. 12, 2019

(51) Int. Cl.
| | | |
|---|---|---|
| *H04L 12/803* | (2013.01) | |
| *H04L 12/26* | (2006.01) | |
| *G06N 3/08* | (2006.01) | |
| *G06N 3/04* | (2006.01) | |
| *H04L 29/08* | (2006.01) | |

(52) U.S. Cl.
CPC .......... *H04L 47/125* (2013.01); *G06N 3/0445* (2013.01); *G06N 3/08* (2013.01); *H04L 43/02* (2013.01); *H04L 67/10* (2013.01)

(58) Field of Classification Search
CPC ....... H04L 47/125; H04L 43/02; H04L 67/10; G06N 3/08
See application file for complete search history.

(56) References Cited

U.S. PATENT DOCUMENTS

| | | | |
|---|---|---|---|
| 2011/0185235 A1* | 7/2011 | Iizuka | H04L 43/0882 714/47.3 |
| 2016/0105364 A1 | 4/2016 | Kanonakis et al. | |
| 2017/0302553 A1 | 10/2017 | Zafer et al. | |
| 2017/0317932 A1 | 11/2017 | Paramasivam | |
| 2018/0063168 A1 | 3/2018 | Sofka | |
| 2018/0287932 A1* | 10/2018 | Viquez Calderon | .... H04L 45/38 |
| 2019/0028537 A1* | 1/2019 | Krishna Singuru | H04L 67/1008 |

(Continued)

FOREIGN PATENT DOCUMENTS

WO   WO-2017065651 A1   4/2017

OTHER PUBLICATIONS

Kim, Hye-Young., "A load balancing scheme with Loadbot in IOT networks", The Journal of Supercomputing, Mar. 2018, vol. 74, Issue 3, pp. 1215-1226, Springer US.

(Continued)

*Primary Examiner* — Kevin C. Harper
*Assistant Examiner* — Derrick V Rose
(74) *Attorney, Agent, or Firm* — Behmke Innovation Group LLC; Kenneth J. Heywood; Jonathon P. Western

(57) ABSTRACT

In one embodiment, a traffic analysis service obtains traffic characteristics of network traffic associated with a device in a network. The traffic analysis service uses a machine learning model to infer resource usage by the device based on the obtained traffic characteristics of the network traffic associated with the device. The traffic analysis service controls traffic flows in the network based on the inferred resource usage by the device.

18 Claims, 7 Drawing Sheets

(56) References Cited

U.S. PATENT DOCUMENTS

2019/0243743 A1\* 8/2019 Saxena ............... G06F 11/3612
2020/0128106 A1\* 4/2020 McCormack .......... G06N 20/20

OTHER PUBLICATIONS

Aljabari, et al., Server Load Prediction Based on Dynamic Neural Networks, Students Innovation Conference, 4 pages, 2012, Palestine Polytechnic University.
Al Sallami, et al., "Load Balancing with Neural Network", (IJACSA) International Journal of Advanced Computer Science and Applications, vol. 4, No. 10, 8 pages, 2013, www.ijacsa.thesai.org.
Che, et al., "Recurrent Neural Networks for Multivariate Time Series With Missing Values", arXiv:1606.01865v2, 14 pages, 2016, arXiv.org.
Gómez-Bombarelli, et al., "Automatic Chemical Design Using a Data-Driven Continuous Representation of Molecules", arXiv:1610.02415v3, 26 pages, 2017, arXiv.org.
Schaerf, et al., "Adaptive Load Balancing: A Study in Multi-Agent Learning", Journal of Artificial Intelligence Research 2, 1995, pp. 475-500, AI Access Foundation and Morgan Kaufmann Publishers.
Shomit Ghose "Engineered Influence: Weak Data, Machine Learning & Behavioral Economics" https://scet.berkeley.edu/engineered-influence-weak-data-machine-learni . . . ; May 17, 2017; pp. 1-5.

\* cited by examiner

INFERRING DEVICE LOAD AND AVAILABILITY IN A NETWORK BY OBSERVING WEAK SIGNAL NETWORK BASED METRICS

TECHNICAL FIELD

The present disclosure relates generally to computer networks, and, more particularly, to inferring server load and availability by observing weak signal network based metrics.

BACKGROUND

Load balancing in a computer network generally seeks to optimize the flow of traffic in the network among different devices. For example, requests may be split between a set of application servers, to ensure that none of the servers become overloaded with requests. Indeed, without load balancing, one of the servers may end up handling the vast majority of requests, while another one of the servers may end up handling few, if any requests.

Typically, load balancers in a network employ an active feedback mechanism with the devices under scrutiny. Under such a feedback mechanism, monitoring agents on the devices measure the statuses of the devices and report the device statuses back to the load balancer. For example, a load balancer may perform "health checks" on a set of servers or micro-service applications, to gather load metrics and track the current loads of the servers or micro-service applications. Based on the load metrics, the load balancer may then send new connections to the server or micro-service application that is the least busy, thereby equitably distributing the load across the set of servers or micro-service applications. However, there are certain circumstances in which an active feedback mechanism is either unfeasible or may impinge too much on the performance of the overall system.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
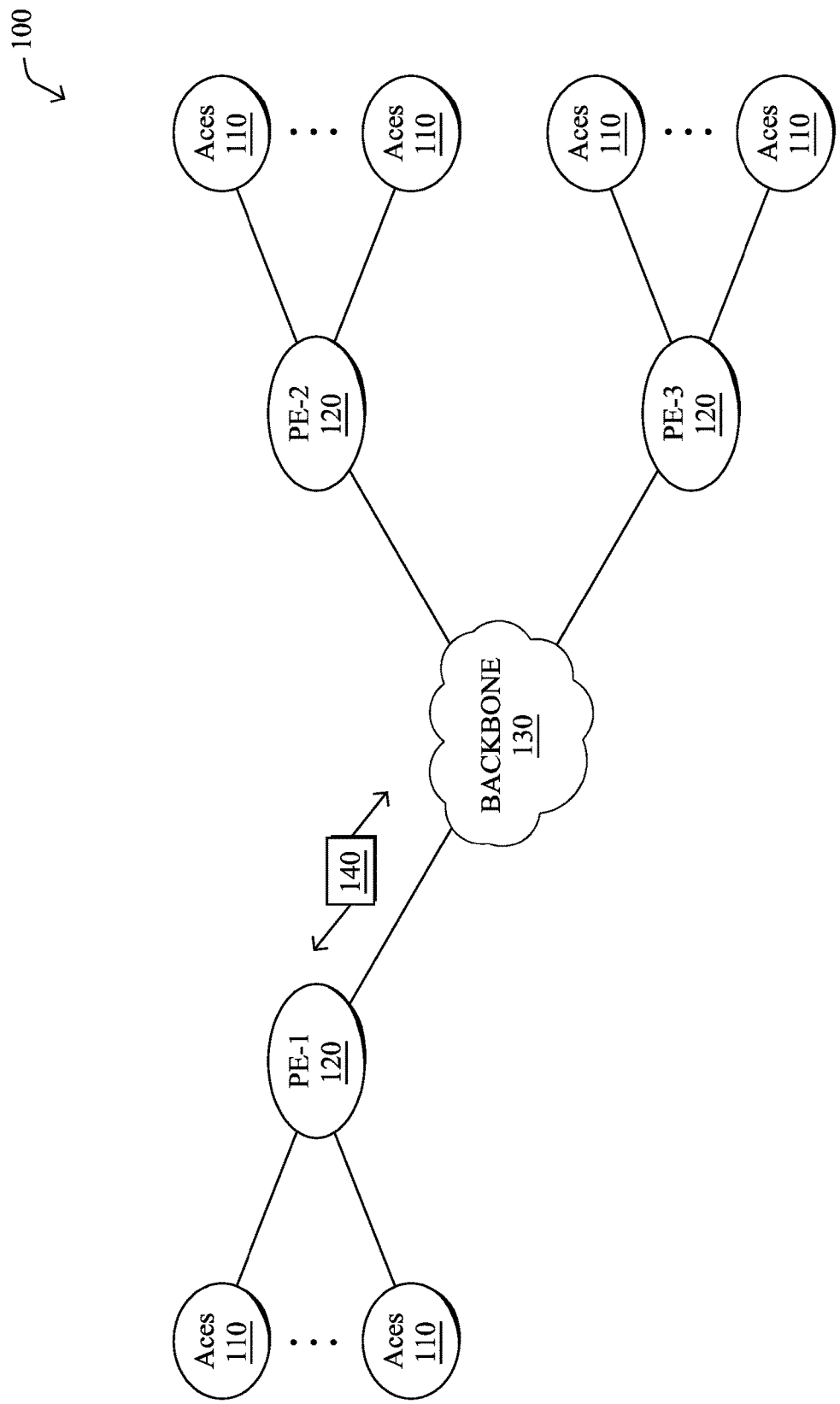
FIGS. 1A-1B illustrate an example communication network.

According to one or more embodiments of the disclosure, a traffic analysis service obtains traffic characteristics of network traffic associated with a device in a network. The traffic analysis service uses a machine learning model to infer resource usage by the device based on the obtained traffic characteristics of the network traffic associated with the device. The traffic analysis service controls traffic flows in the network based on the inferred resource usage by the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B 1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
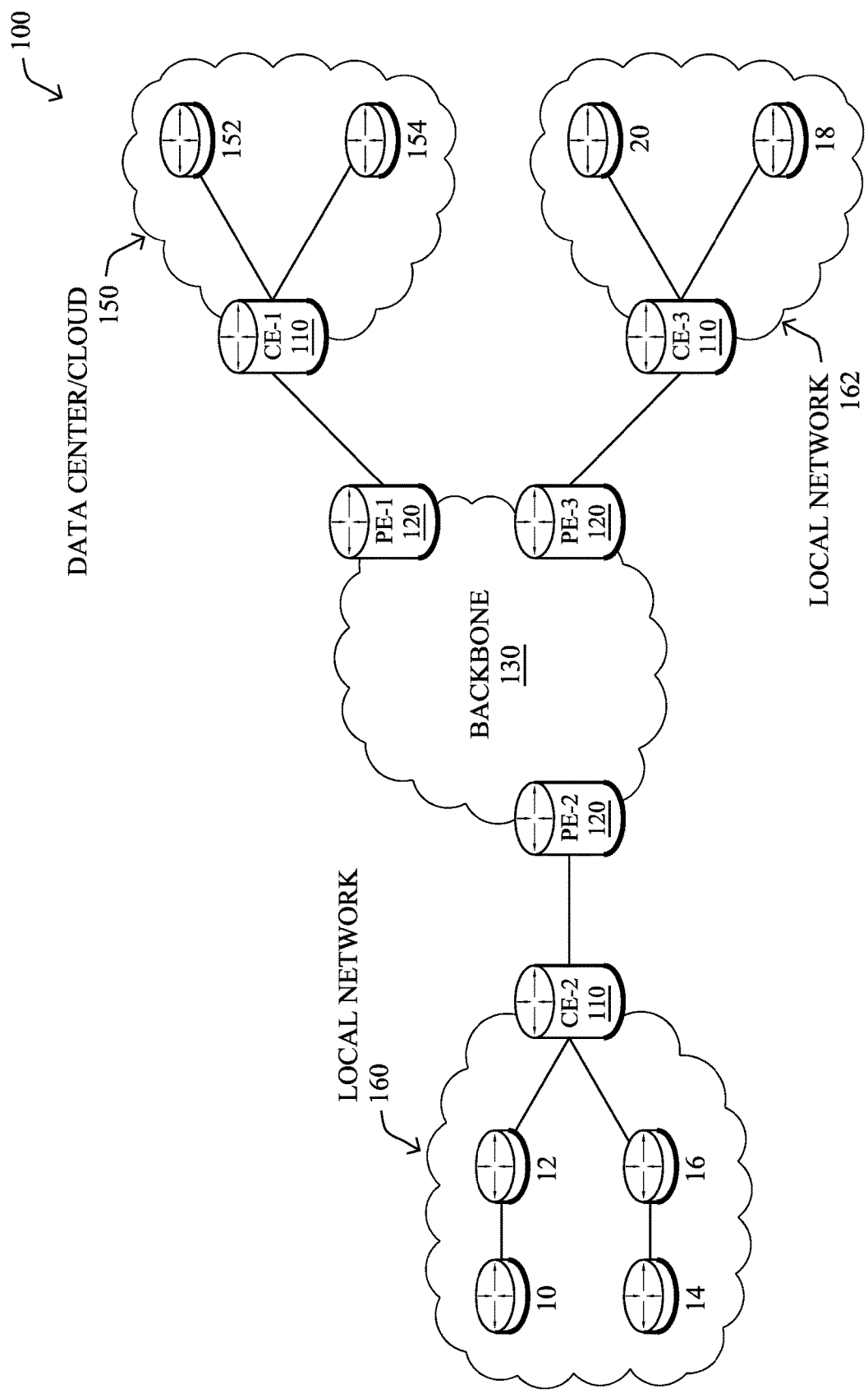

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
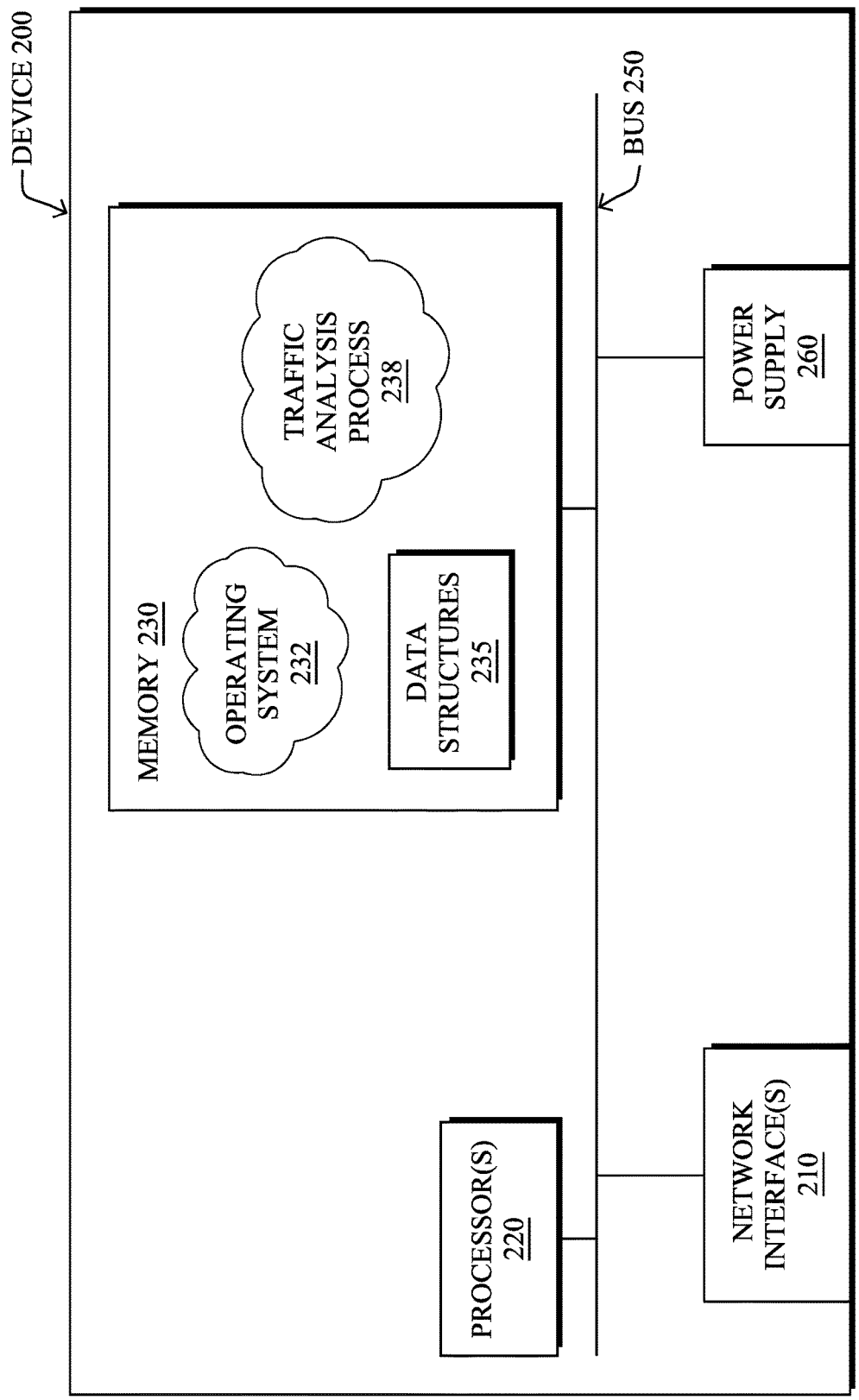
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 230 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 230 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 235. An operating system 230 (e.g., the Internetworking Operating System, or IOS®, of Cisco Systems, Inc., another operating system, etc.), portions of which are typically resident in memory 230 and executed by the processor(s), functionally organizes the node by, inter alia, invoking network operations in support of software processors and/or services executing on the device. These software processors and/or services may comprise a traffic analysis process 238.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 238 may execute one or more machine learning-based models to analyze traffic characteristics of traffic in a computer networks, in various embodiments. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. The learning process then operates by adjusting the underlying hyper-parameters such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, traffic analysis process 238 may employ one or more supervised, unsupervised, or semi-supervised machine learning models. Generally, supervised learning entails the use of a training set of data, as noted above, that is used to train the model to apply labels to the input data. For example, the training data may include sample traffic observations and the observed device loads that are associated with the traffic observations. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that traffic analysis process 238 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, recurrent neural networks (RNNs), or the like. Accordingly, traffic analysis process 238 may employ deep learning, in some embodiments. Generally, deep learning is a subset of machine learning that employs ANNs with multiple layers, with a given layer learning a higher level representation of the input or transforming the outputs of the prior layer.

In some cases, traffic analysis process 238 may assess the captured telemetry data on a per-flow basis. In other embodiments, traffic analysis 238 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

As noted above, load balancers often make use of an active feedback mechanisms (e.g., "health checks" for conveying specific load metrics as reported by a server or micro-service application instance), in order to track the current load across a set of application servers. This information is then used by the load balancer when selecting a server for new connections, typically selecting the less busy server, to achieve better load-balancing fairness.

While feedback-based approaches to load balancing in a network are suitable for many deployments, there are also certain drawbacks to these approaches:

1. Load balancing using a feedback mechanism requires the installation of monitoring agents on the devices for load monitoring, thereby decreasing the available resources on the devices.
2. Load balancing using a feedback mechanism requires control monitoring messages to be exchanged between the load balancer and the devices, consuming additional network resources and requiring frequent updating, to approach real-time measurements.
3. Load balancing using a feedback mechanism introduces a delay between the load measurement and the availability of that measurement to the load balancer.
4. Load balancing using a feedback mechanism does not take network congestion or path characteristics into account, unless combined with active network operations, administration, and management (OAM) probes, as well.
5. Load balancing using a feedback mechanism is limited to basing load balancing decisions only on the metrics that the monitored devices or applications are able to report.

Inferring Device Load and Availability in a Network by Observing Weak Signal Network Based Metrics The techniques herein introduce a load balancing mechanism that allows a router, switch, network interface controller (NIC), or other load balancing appliance in a network to infer application server or application instance load based on locally observed network traffic. In some aspects, observed traffic characteristics (e.g., packet inter-arrival times, packet sizes, flow information extracted from the transport layer, etc.) can be used as input to a machine learning model, to infer the load/resource usage by the device associated with the traffic. For example, in some embodiments, the machine learning model may be a multimodal RNN that uses data fusion on the observed traffic characteristics to predict the true load of the servers or other devices associated with the traffic. Such a model may be trained by polling the device load on a regular basis, to determine the true load of the device, and associating the true loads with the network traffic characteristics, to form a training dataset for the model. Based on the inferred loads, the load balancing appliance can then control the traffic flows, accordingly.

Specifically, according to one or more embodiments of the disclosure as described in detail below, a traffic analysis service obtains traffic characteristics of network traffic associated with a device in a network. The traffic analysis service uses a machine learning model to infer resource usage by the device based on the obtained traffic characteristics of the network traffic associated with the device. The traffic analysis service controls traffic flows in the network based on the inferred resource usage by the device.

Illustratively, the techniques described herein may be performed by hardware, software, and/or firmware, such as in accordance with the traffic analysis process 238, which may include computer executable instructions executed by the processor 220 (or independent processor of interfaces 210) to perform functions relating to the techniques described herein.

Figure 3A:
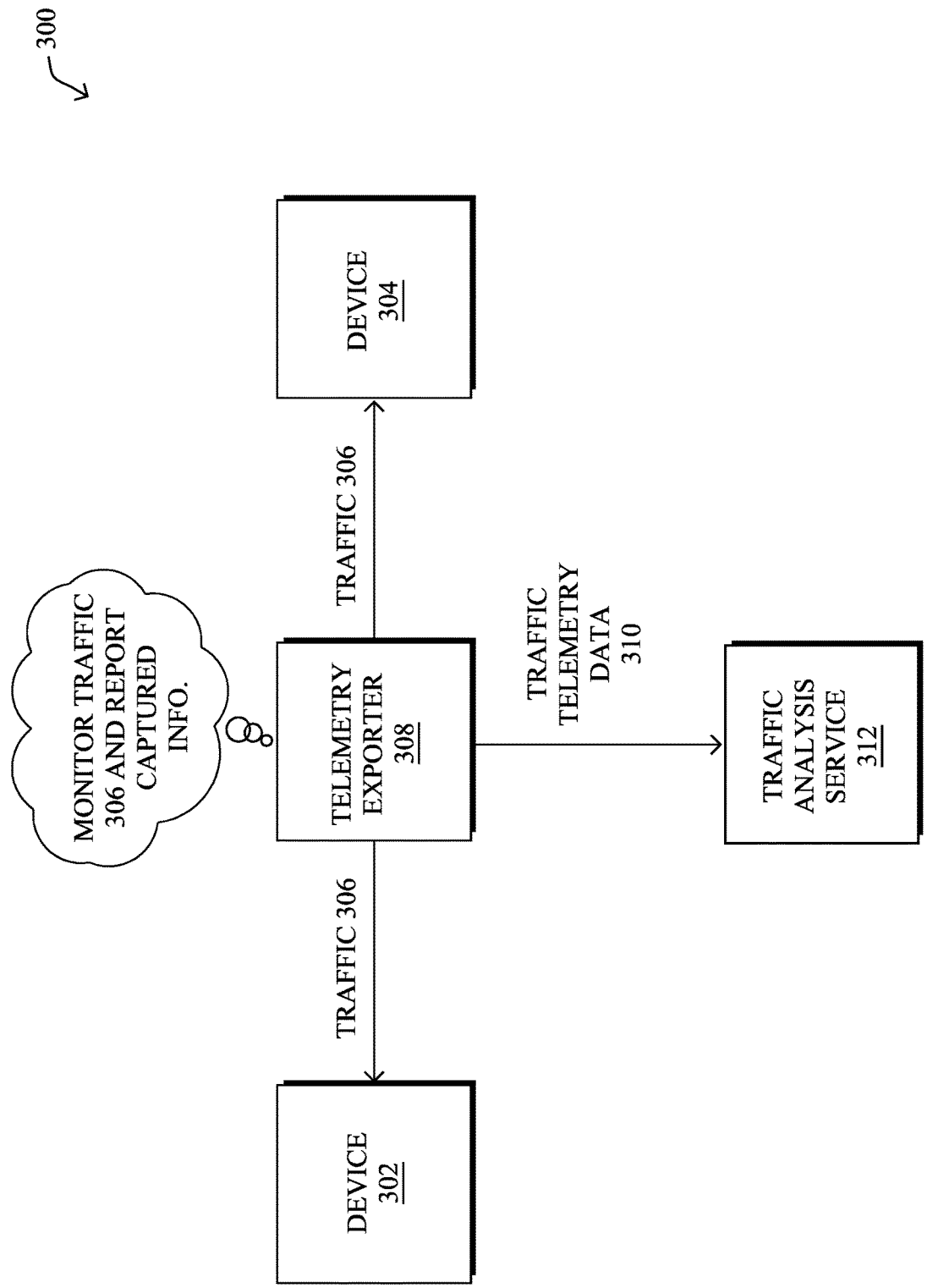
FIGS. 3A-3B illustrate an example of using traffic characteristics to infer device resource usage.
Figure 3B:
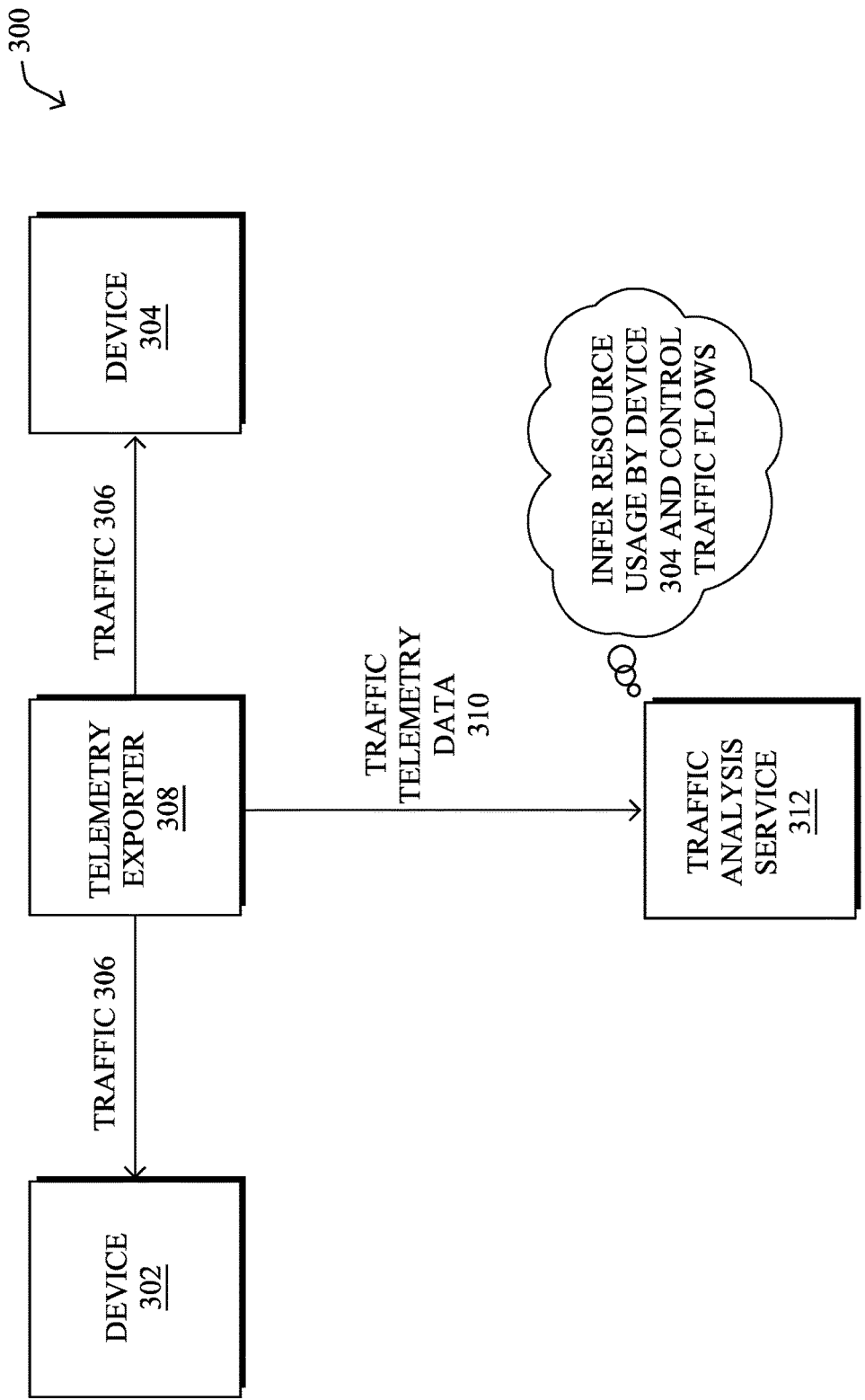

Operationally, FIGS. 3A-3B illustrate an example of using traffic characteristics to infer device resource usage. As shown in FIG. 3A, assume that a network 300 includes devices 302 and 304 that communicate with one another. For example, in many cases, device 302 may be a client device that communicates with a remote server or service instance via network 300. More specifically, device 302 may execute an application that generates and exchanges traffic 306 with device 304 via network 300.

Located along the network path between device 302 and device 404 may be any number of telemetry exporters, such as telemetry exporter 308 shown. For example, telemetry exporter 308 may be a switch (e.g., top of rack switch, etc.), router (e.g., edge router of a datacenter in which device 304 is located, etc.), server NIC, network controller, or other networking equipment via which traffic 306 sent between device 302 and device 304 flows. During operation, traffic telemetry exporter 308 may capture data regarding traffic 306, generate traffic telemetry data 310 based on the captured data, and send traffic telemetry data 310 to traffic analysis service 312 for assessment. For example, traffic telemetry data 310 may include Internet Protocol Flow Information Export (IPFIX) records and/or Netflow records regarding traffic 306.

In various embodiments, network 300 may also include a traffic analysis service 312 that is implemented by one or more devices in network 300 through the execution of traffic analysis process 238. For example, in some cases, traffic analysis service 312 may be implemented by one or more devices in the local network of device 304. However, in further cases, traffic analysis service 312 may be implemented as a cloud service that is in communication with telemetry exporter 308 and device 304, either directly or indirectly. For quicker traffic analysis, traffic analysis service 312 may be implemented on the same device as telemetry exporter 308, thereby forgoing having to send telemetry data 310 to traffic analysis service 312 via the network.

In some embodiments, telemetry exporter 308 may analyze packet headers, to capture feature information about traffic 306. For example, telemetry exporter 308 may capture the source address and/or port of device 302, the destination address and/or port of device 304, the protocol(s) used by the packets of traffic 306, or other header information by analyzing the header of a packet from traffic 306. Telemetry exporter 308 can also capture flow information extracted from the transport layer of traffic 306 such as, but not limited to, duplicate TCP acknowledgements, out-of-order TCP packets, and the like. Further examples of captured traffic features/characteristics may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, telemetry exporter 308 may also assess the payload of the packet to capture information about traffic 306, such as an application associated with the traffic (e.g., whether traffic 306 is web traffic, video conferencing traffic, etc.). For example, telemetry exporter 308 may perform deep packet inspection (DPI) on one or more of packets of traffic 306, to assess the contents of the packet. Doing so may, for example, yield additional information that can be used to determine the application associated with the traffic flow (e.g., the packets were sent by a web browser of device 302, the packets were sent by a videoconferencing application, etc.). However, as would be appreciated, a traffic flow may also be encrypted, thus preventing the device from assessing the actual payload of the packet. In such cases, the characteristics of the application can instead be inferred from the captured header information from traffic 306.

Telemetry exporter 308 may also compute any number of statistics or metrics regarding traffic 306. For example, telemetry exporter 308 may determine the start time, end time, duration, packet size(s), the distribution of bytes within a flow, etc., associated with the traffic flow by observing traffic 306. In further examples, telemetry exporter 308 may capture sequence of packet lengths and time (SPLT) data regarding traffic 306, sequence of application lengths and time (SALT) data regarding traffic 306, and/or byte distribution (BD) data regarding traffic 306.

As shown in FIG. 3B, traffic analysis service 312 may infer (e.g., predict) the resource usage (e.g., load) of device 304 based in part on the traffic characteristics of traffic 306, as indicated by traffic telemetry data 310. Notably, in various embodiments, traffic analysis service 312 may analyze the characteristics of the traffic associated with device 304 to infer the resource usage of device 304, such as its central processing unit (CPU) consumption, memory consumption, queue state, or the like. In particular, traffic analysis service 312 may employ a trained machine learning model, to determine the load of device 304, based on the characteristics of its traffic, such as packet sizes, packet timing information, and the like.

From a machine learning perspective, the characteristics of the traffic associated with device 304 are considered to be "weak" signals for the current load of device 304. In general, "strong" signals are typically highly predictive of a given condition or state, whereas the effects of "weak" signals are not readily identifiable on the condition or state and shall refer to, in the specific case of load balancing, as those signals that enable the prediction of the emergence of events that may be relevant for effective load balancing. For example, the make and model of a vehicle, the age of the vehicle's driver, etc. are all strong signals that can be used to predict future insurance claims that the driver may submit. Weak signals, in contrast, may also have predictive value, but typically in a way that is not self-evident. For example, whether the driver drinks lemonade, whether the driver plays golf, etc. are all weak signals that could still have predictive value for predicting whether the driver is likely to submit an insurance claim in the future.

To infer the resource usage of device 304, traffic analysis service 312 may use a machine learning model that fuses information from different modalities with distinct statistical properties and highly non-linear relationships between low-level features of the modalities. In particular, the model (1) can simultaneously fuse the information from different input sources (e.g., continuous, categorical, discrete, etc.) to capture the temporal structure of the data; (2) can dynamically weight different input modalities to filter out those signal(s) that are semantically correlated to the output missing values (also referred to as "informative missingness"); and (3) can generalize to different kinds of multimodal temporal input sets (i.e., it is not limited to a particular choice of the input signals and different type of inputs are possible).

In various embodiments, traffic analysis service 312 may use its predictions regarding the resource usage by device 304, to control traffic flows in network 300. For example, assume that traffic analysis service 312 is executed by the same device as telemetry exporter 308. In such a case, traffic analysis service 312 can direct new traffic flows in network 300 as follows:

- Direct new traffic flows (e.g., new requests, new sessions, etc.) away from device 304 and towards another device in network 300, if the inferred resources used by device 304 are above a predefined threshold.
- Direct new traffic flows towards device 304, if the inferred resources used by device 304 are below a predefined threshold.
- Load balance traffic flows between a set of devices that include device 304 and one or more other devices, to optimize the loads of the devices in the set. Such optimization may entail an equitable distribution of load across the devices, allocating loads according to the total resources of the devices (e.g., by sending more traffic to more capable devices, etc.), or using any other load balancing approach, as desired.

Figure 4:
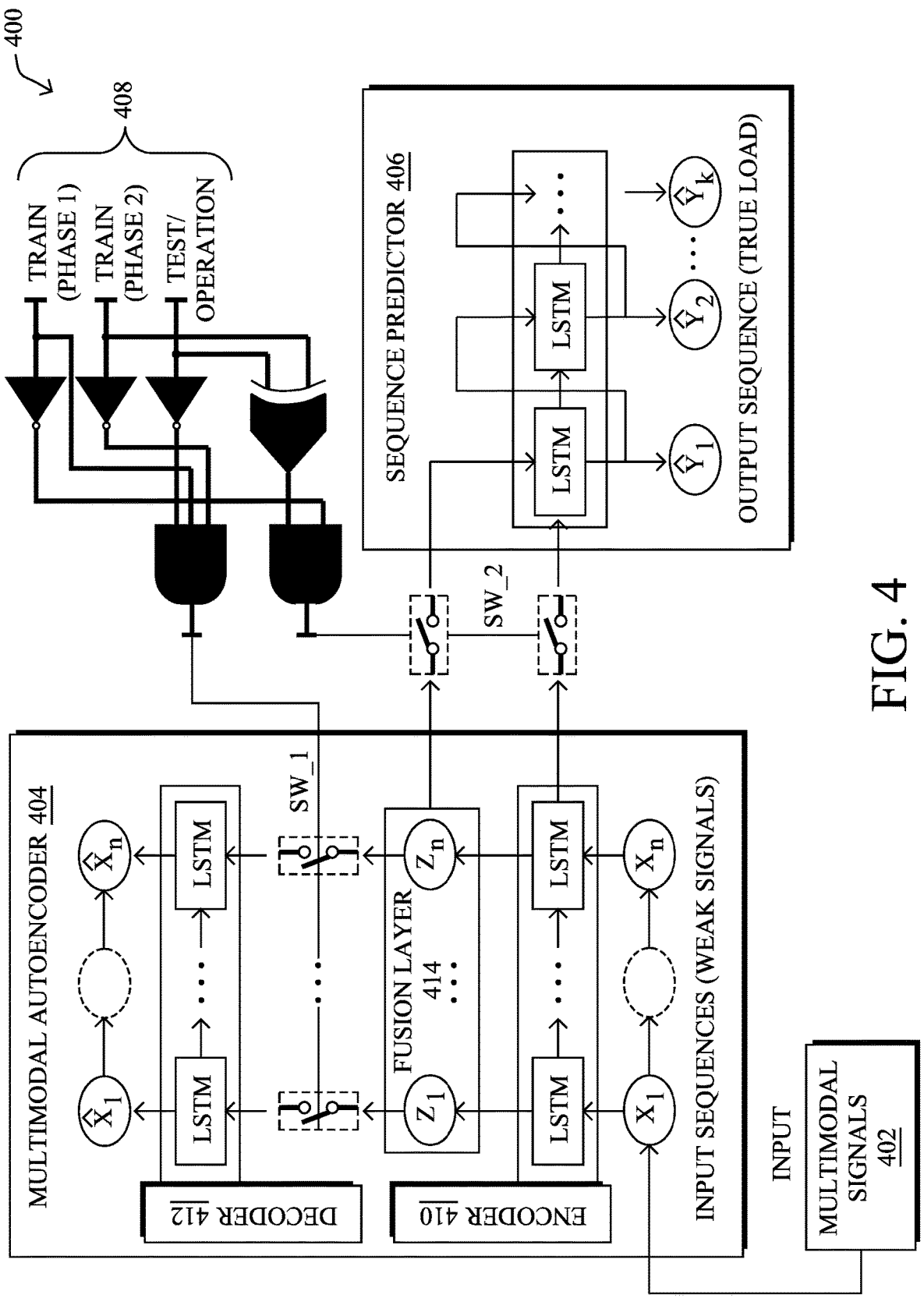
FIG. 4 illustrates an example machine learning model architecture for inferring device resource usage.

FIG. 4 illustrates an example machine learning model architecture 400 that a traffic analysis service can use to infer the resource usage of a device in a network, according to various embodiments. In some embodiments, architecture 400 is a Long Short-Term Memory (LSTM) Encoder-Decoder architecture that enables multimodal sequence-to-sequence learning and the learning of sequence representations. The purpose of architecture 400 is to be able to learn the relationship between an input sequence of multimodal "weak signals" 402, which correspond to the various traffic characteristics that can be captured regarding the traffic associated with a device, and a down-sampled output sequence of "true loads," that corresponds to the resource usage/load of the device.

In particular, machine learning model architecture 400 consists of three recurrent neural nets: (1) a multimodal encoder 410, (2) a multimodal decoder 412, and (3) a sequence predictor 406. Encoder 410 and decoder 412 form a multimodal LSTM autoencoder 404 that compresses and reconstructs high dimensional inputs and build fusion layer 414 of autoencoder 404. The multimodal encoder 410 and sequence predictor 406 form the multiple sequence-to-sequence network that up-sample the output sample representing the true load given the input sequences of weak signals 402 (e.g., the observed traffic characteristics).

In various embodiments, model architecture 400 can be trained in three phases by control of logic circuitry 408, which can be implemented in either hardware or software, by the following truth table:

TABLE 1

| Phase1 | Phase2 | Test/OP | SW_1 | SW_2 |
|---|---|---|---|---|
| 1 | 0 | 0 | 1 | 0 |
| 0 | 1 | 0 | 0 | 1 |
| 0 | 0 | 1 | 0 | 1 |
| otherwise | | | 0 | 0 |

In particular, the logic circuitry 408 can be controlled to enact a first training phase, a second training phase, and a testing/operation phase controlling the state of Boolean outputs SW_1 and SW_2 depending to the state of Boolean exclusive inputs Phase1, Phase2, Test/OP as follows:

1. In Training Phase 1, the logic input Train Phase 1 in logic circuitry 408 is active (Phase1=1, Phase2=Test/OP=0), thus output SW_1 is enabled while output SW_2 is disabled. In this phase the sequence predictor 406 is not used (SW_2=0) while multimodal autoencoder 404 (SW_1=1) is trained to map the input sequences (weak signals) 402 into a joint representation (the common space). Namely, multimodal decoder 412 reconstructs the input sequences $(X_1, X_2, \ldots, X_n)$ from the joint representation obtained by encoder 410. During this training process, the model learns a joint representation that retains as much information as possible from all input modalities. The multimodal inputs 402 are first mapped to separate hidden layers before being forwarded to the common layer (fusion layer 414). Similarly, the joint representation is first decoded to separate hidden layers before reconstruction of the multimodal inputs takes place. The rationale in this phase is to ensure that fusion layer 414 provides a continuous and dense representation of the input signals modalities independently of their type (e.g., continuous, discrete, categorical, etc.) and actually acting as a pre-training phase for the sequence-to-sequence learning neural network that follows.
2. In Training Phase 2, the logic input Train Phase 2 in logic circuitry 408 is active (Phase2=1, Phase1=Test/OP=0), thus output SW_2 is enabled while output SW_1 is disabled. In this phase, the multimodal predictor is not used (SW_1=0) while sequence predictor 406 is connected to fusion layer 414 and trained supervised to generate the output sequence (i.e., the true load) by predicting the next symbol given the hidden state of fusion layer 414 (SW_2=1) at the low sampling rate of the output sequence (true load) used as a ground-truth. On a regular basis, a measurement is performed on each device of interest, in order to retrieve the measured load at predefined points in time. Those measurements are used to train the sequence-to-sequence network and learning the non-linear mapping between input and output.
3. In the Test/Operation phase (Phase 3), the logic input Test/Operation in logic circuitry 408 is active (Test/OP=1, Phase1=Phase2=0), thus output SW_2 is enabled while output SW_1 is disabled. In this phase, testing and prediction (inference) are performed, connecting multimodal encoder 410 (SW_1=0, SW_2=1) to fusion layer 414 and to sequence predictor 406. In this configuration, sequence predictor 406 will generate output sequences $(Y_1, Y_2, \ldots, Y_k)$ at the high sampling rate of the input sequences 402. In other words, architecture 400 deeply interpolates the output true load time series for the device, given the multivariate input time series.

As would be appreciated, architecture 400 is a modular neural network (MNN) architecture that can be used in real time to infer (predict) the load of server instances, and other devices in a network, given the weak signals fluctuations observed. Input signals 402 used by architecture 400 can be of any type (e.g., continuous, categorical, discrete, etc.) and may include, but are not limited to:

packets counts going to and coming from the different servers or other devices
 Array of packets inter-arrival time, array of packets size, etc.
 Response transfer time, waiting time, turnaround time, round trip time, etc.
 packets events information, TCP flags, etc.
 Information inferred from the transport layer (e.g., out-of-order TCP packets, duplicate TCP acknowledgements, etc.).

Fundamentally, the reason the techniques herein work is that an overloaded server behaves, from a networking perspective, differently from a server with a high amount of available resources (e.g., low CPU usage). However, these behavioral changes are often extremely subtle and can be application dependent, as well. Depending on the context, an overloaded server may have less time to process packet receptions and transmissions, as most CPU time is used by the application. In network intensive scenarios, the application service will show increased delays in the acknowledgement of packets. It is also possible that the packet jitter will increase, delays due to loaded buffers will become more present, packets that may be re-transmitted in bulk, etc. Application level adaptive techniques may be triggered as well, as in the case of streaming of adaptive bitrate (ABR) video traffic. In short, it is hard to anticipate which will be the actual behavior, and as such largely cumbersome to find a heuristic that works in all situations or without burdensome tweaking and hand-crafted configurations.

Figure 5:
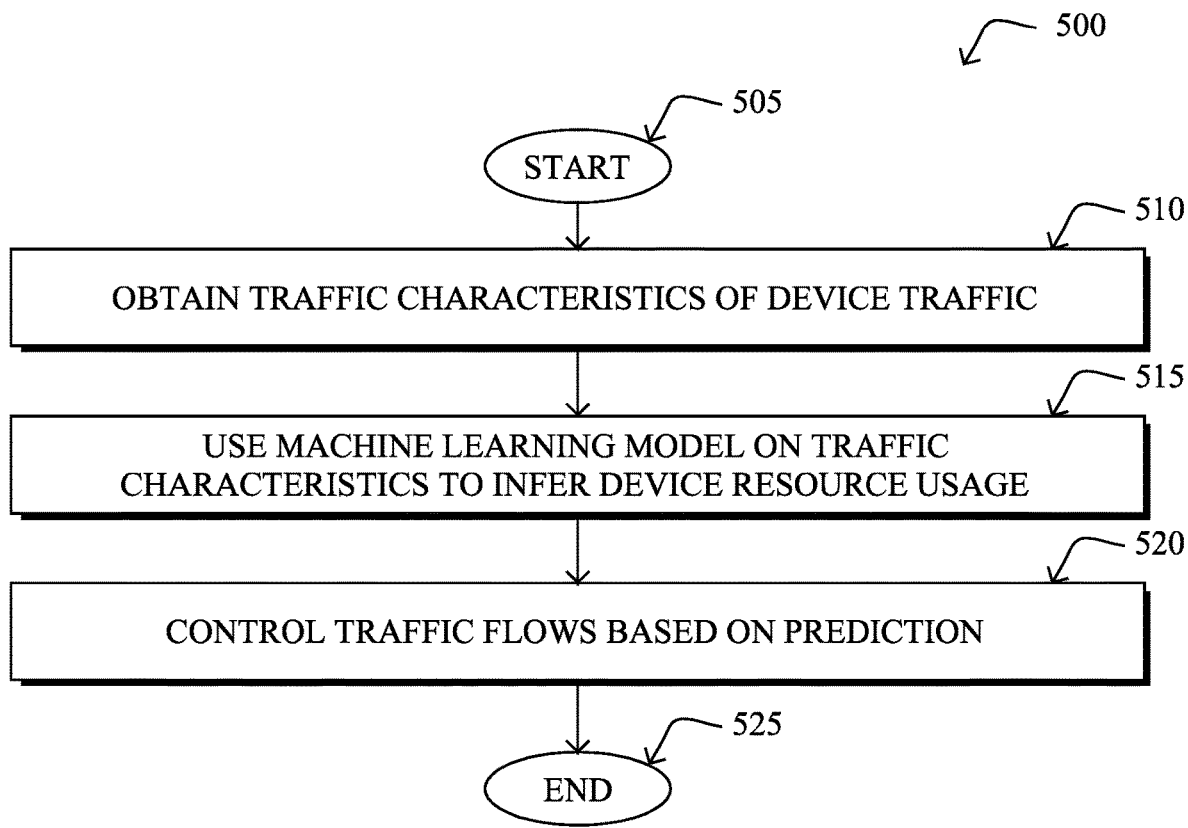
FIG. 5 illustrates an example simplified procedure for inferring device load and availability in a network.

FIG. 5 illustrates an example simplified procedure for inferring device load and availability in a network, in accordance with one or more embodiments described herein. For example, a non-generic, specifically configured device (e.g., device 200) may perform procedure 500 by executing stored instructions (e.g., process 238), to implement a traffic analysis service in the network. The procedure 500 may start at step 505, and continues to step 510, where, as described in greater detail above, the traffic analysis service obtains traffic characteristics of network traffic associated with a device in a network. For example, the device may be a physical server in the network, a virtual micro-service/application, or the like. In some cases, the traffic analysis service may be executed on an intermediary device via which the traffic is conveyed and captures the traffic characteristics. In other cases, the traffic analysis service may receive traffic flow telemetry data from one or more such intermediaries. The traffic characteristics may include, but are not limited to, packet header information (e.g., flags, protocols, etc.), packet timing information (e.g., inter-arrival times, delays, etc.), application information, performance information (e.g., packet drops, jitter, etc.), and/or any other information that can be collected about the traffic associated with the device under scrutiny.

At step 515, as detailed above, the traffic analysis service may use a machine learning model to infer resource usage by the device under scrutiny, based on the obtained traffic characteristics of the network traffic associated with the device. In various embodiments, the machine learning model may comprise a long short-term memory (LSTM)-based encoder-decoder and a sequence predictor, as described with respect to FIG. 4. Such an architecture may use the traffic characteristics as input, to infer/predict the load/available resources of the device under scrutiny. For example, the model may predict the CPU usage of the device, memory usage of the device, or the like, to infer the current load of the device from its traffic characteristics.

At step 520, the traffic analysis service may control traffic flows in the network based on the inferred resource usage by the device, as described in greater detail above. In various embodiments, the service may use the inferred resource usage of the device to perform load balancing between the device and any number of other devices in the network (e.g., to divide server requests between the device and other servers, etc.). In some case, if the inferred resource usage is above a threshold, the service may divert traffic flows away from the device. Conversely, if the inferred resource usage is below a defined threshold, the service may divert traffic flows towards the device, in further cases. Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a service in a network to infer device/server load through analysis of its traffic characteristics. In some aspects, the techniques herein leverage machine learning, to identify the metrics that are the most meaningful for a particular deployment (e.g., application, hardware, topology, etc.), as well as jointly learning to predict and fuse information from multiple weak input signals (e.g., detecting small fluctuations in packet inter-arrival times, etc.). This can be done without the use of heuristics, which can often be cumbersome or nearly impossible to define, otherwise.

In comparison to existing approaches to load balancing in a network, the techniques herein also introduce a module neural network-based architecture that infers short-term, true load variations based on the realizations of observable weak signals (e.g. packet size, inter packets arrival time, throughput, etc.). To this end, the architecture introduced herein uses (1) an LSTM autoencoder for multimodal signal fusion and (2) an LSTM sequence-to-sequence decoder for true load prediction. In other words, the techniques herein describe a method to infer these short-term true load samples using the short-term weak signal samples that implicitly define the "hidden" metrics and functionally linking "weak signals" to "true load" that is eventually learned by the modular neural network (MNN).

While there have been shown and described illustrative embodiments that provide for inferring device load and availability in a network based on its weak signal traffic characteristics, it is to be understood that various other adaptations and modifications may be made within the spirit and scope of the embodiments herein. For example, while certain embodiments are described herein with respect to using certain models for purposes of traffic analysis and load balancing, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a traffic analysis service, traffic characteristics from telemetry data associated with a device in a network, wherein the telemetry data is generated based on network traffic sent from the device to another device in the network that is captured by an intermediary device located along a network path between the device and the other device;
    measuring, by the traffic analysis service, a load of the device at predefined points in time;
    training, by the traffic analysis service, a machine learning model using a training dataset formed by associating the measured load of the device at each of the predefined points in time with the traffic characteristics of the network traffic;
    using, by the traffic analysis service, the machine learning model to infer the resource usage of the device based on the traffic characteristics of the network traffic; and
    controlling, by the traffic analysis service, traffic flows in the network based on the inferred resource usage of the device.

2. The method as in claim 1, wherein the inferred resource usage is a central processing unit (CPU) usage of the device.

3. The method as in claim 1, wherein the traffic characteristics of the network traffic comprise one or more of: packet counts, packet flags, or packet timing information.

4. The method as in claim 1, wherein controlling the traffic flows in the network based on the inferred resource usage of the device comprises:
    diverting the traffic flows to avoid the device, based on the inferred resource usage being above a predefined threshold.

5. The method as in claim 1, wherein the machine learning model comprises a long short-term memory (LSTM)-based encoder-decoder and a sequence predictor.

6. The method as in claim 1, wherein controlling the traffic flows in the network based on the inferred resource usage of the device comprises:
    diverting the traffic flows towards the device, based on the inferred resource usage being below a predefined threshold.

7. The method as in claim 1, wherein controlling the traffic flows in the network based on the inferred resource usage of the device comprises:
    load balancing the traffic flows between the device and one or more other devices in the network, based on the inferred resource usage of the device.

8. The method as in claim 1, wherein the device in the network comprises a server or plurality of micro-service instances.

9. An apparatus, comprising:
    one or more network interfaces to communicate with a network;
    a processor coupled to the network interfaces and configured to execute one or more processes; and
    a memory configured to store a process executable by the processor, the process when executed configured to:
        obtain traffic characteristics from telemetry data associated with a device in a network, wherein the telemetry data is generated based on network traffic sent from the device to another device in the network that is captured by an intermediary device located along a network path between the device and the other device;
        measure a load of the device at predefined points in time;
        train a machine learning model using a training dataset formed by associating the measured load of the device at each of the predefined points in time with the traffic characteristics of the network traffic;
        use the machine learning model to infer the resource usage of the device based on the traffic characteristics of the network traffic; and
        control traffic flows in the network based on the inferred resource usage of the device.

10. The apparatus as in claim 9, wherein the inferred resource usage is a central processing unit (CPU) usage of the device.

11. The apparatus as in claim 9, wherein the traffic characteristics of the network traffic comprise one or more of: packet counts, packet flags, or packet timing information.

12. The apparatus as in claim 9, wherein the apparatus controls the traffic flows in the network based on the inferred resource usage of the device by:
    diverting the traffic flows to avoid the device, based on the inferred resource usage being above a predefined threshold.

13. The apparatus as in claim 9, wherein the machine learning model comprises a long short-term memory (LSTM)-based encoder-decoder and a sequence predictor.

14. The apparatus as in claim 9, wherein the apparatus controls the traffic flows in the network based on the inferred resource usage of the device by:
    diverting the traffic flows towards the device, based on the inferred resource usage being below a predefined threshold.

15. The apparatus as in claim 9, wherein the apparatus controls the traffic flows in the network based on the inferred resource usage of the device by:
    load balancing the traffic flows between the device and one or more other devices in the network, based on the inferred resource usage of the device.

16. The apparatus as in claim 9, wherein the device in the network comprises a server or plurality of micro-service instances.

17. The apparatus as in claim 9, wherein the apparatus comprises at least one of: a router, a switch, a network interface controller, or a load balancer.

18. A tangible, non-transitory, computer-readable medium storing program instructions that cause a traffic analysis service to execute a process comprising:
    obtaining, by the traffic analysis service, traffic characteristics from telemetry data associated with a device in a network, wherein the telemetry data is generated based on network traffic sent from the device to another device in the network that is captured by an intermediary device located along a network path between the device and the other device;

measuring, by the traffic analysis service, a load of the device at predefined points in time;

training, by the traffic analysis service, a machine learning model using a training dataset formed by associating the measured load of the device at each of the predefined points in time with the traffic characteristics of the network traffic;

using, by the traffic analysis service, the machine learning model to infer the resource usage of the device based on the traffic characteristics of the network traffic; and controlling, by the traffic analysis service, traffic flows in the network based on the inferred resource usage of the device.

* * * * *